(12) United States Patent
Przybylski

(10) Patent No.: US 8,457,686 B2
(45) Date of Patent: Jun. 4, 2013

(54) METHOD OF COMMUNICATION BETWEEN A VEHICLE TELEMATICS UNIT AND A CALL CENTER

(75) Inventor: Matthew G. Przybylski, Grand Blanc, MI (US)

(73) Assignee: General Motors LLC, Detroit, MI (US)

( * ) Notice: Subject to any disclaimer, the term of this patent is extended or adjusted under 35 U.S.C. 154(b) by 102 days.

(21) Appl. No.: 12/958,823

(22) Filed: Dec. 2, 2010

(65) Prior Publication Data

US 2012/0142367 A1    Jun. 7, 2012

(51) Int. Cl.
*H04M 1/00* (2006.01)

(52) U.S. Cl.
USPC ... 455/556.1; 455/41.2; 455/41.3; 455/556.2; 455/569.1; 455/569.2; 455/557; 455/558; 455/559

(58) Field of Classification Search
USPC .................. 455/41.2, 41.3, 569.1, 0.2, 556.1, 455/557, 558, 559; 370/310.2, 328, 338
See application file for complete search history.

(56) References Cited

U.S. PATENT DOCUMENTS

| | | | |
|---|---|---|---|
| 5,062,132 A * | 10/1991 | Yasuda et al. | 455/557 |
| 6,748,244 B2 * | 6/2004 | Odinak | 455/569.2 |
| 7,266,435 B2 * | 9/2007 | Wang et al. | 701/36 |
| 7,689,325 B2 * | 3/2010 | Farrow | 701/2 |
| 7,801,283 B2 * | 9/2010 | Harwood et al. | 379/88.03 |
| 7,894,795 B1 * | 2/2011 | Dunne et al. | 455/406 |
| 2002/0068543 A1 * | 6/2002 | Shah | 455/351 |
| 2006/0234781 A1 * | 10/2006 | Bosch | 455/569.2 |

* cited by examiner

*Primary Examiner* — Steve D Agosta
(74) *Attorney, Agent, or Firm* — Anthony Luke Simon; Reising Ethington P.C.

(57) ABSTRACT

A method and system of communication between a vehicle telematics unit and a call center via a personal mobile device identifier. The method involves detecting the presence of a personal mobile device at a vehicle, receiving a mobile device identifier from the mobile device, assigning the mobile device identifier to a telematics unit in the vehicle, establishing a data session between the telematics unit and a call center, and sending the mobile device identifier to the call center via the data session.

3 Claims, 2 Drawing Sheets

METHOD OF COMMUNICATION BETWEEN A VEHICLE TELEMATICS UNIT AND A CALL CENTER

TECHNICAL FIELD

The present invention relates generally to a method of communication between a vehicle telematics unit and a call center and, more particularly, to a method where a vehicle operator mobile device identifier is used to establish such a communication.

BACKGROUND OF THE INVENTION

There have been a number of different approaches to equipping vehicles with wireless communication technology such as a cellular chipset that permits communication between the vehicle and a cellular network. In some systems, a vehicle telematics unit is integrated into the vehicle electronics system such that the telematics unit can communicate with different vehicle systems to provide telematics services, some of which involve communication with a remote call center over the cellular network. Other systems are provided primarily as a user interface for the vehicle operator's personal mobile phone so that, for example, they can place and receive calls in a hands-free manner. In these known latter systems, the vehicle cellular phone takes on the identity of the mobile phone so that calls placed to the mobile phone are sent to the vehicle phone. In GSM cellular networks, this can be done by sending a SIM access profile, which can be done via a Bluetooth connection between the mobile phone and vehicle phone. In this system, the vehicle cellular phone is not used independently of the mobile phone; that is, it does not have its own assigned IMSI or other mobile number, nor is it used for the range of telematics services delivered by the type of integrated telematics unit described above.

SUMMARY OF THE INVENTION

According to one embodiment, there is provided a method of communication between a vehicle telematics unit and a call center using a personal mobile device identifier, comprising the steps of: (a) detecting the presence of a personal mobile device at a vehicle; (b) receiving a mobile device identifier from the mobile device; (c) assigning the mobile device identifier to a telematics unit in the vehicle; (d) establishing a data session between the telematics unit and a call center; and (e) sending the mobile device identifier to the call center via the data session.

In another embodiment, there is provided a method of communication between a vehicle telematics unit and a call center using a personal mobile device identifier, comprising the steps of: (a) pairing a mobile device located at a vehicle with a telematics unit in the vehicle via a Bluetooth connection; (b) obtaining a mobile device identifier from the mobile device via the Bluetooth connection; (c) replacing a telematics unit identifier in the telematics unit with the mobile device identifier; and (d) receiving a call at the telematics unit from the call center that was placed using the mobile device identifier.

In yet another embodiment, there is provided a method of communication between a vehicle telematics unit and a call center via a vehicle operator mobile device identifier, comprising the steps of: (a) providing a vehicle telematics unit having an embedded cellular phone that includes a subscriber identity module (SIM) used for communications between the telematics unit and a call center; (b) registering the cellular phone with a cellular communications network using a telematics unit identifier stored in the SIM; (c) linking to a personal mobile device present at the vehicle via a Bluetooth connection; (d) receiving at the telematics unit via the Bluetooth connection, a mobile device identifier stored on a SIM in the mobile device; (e) temporarily replacing the telematics unit identifier in the telematics unit with the mobile device identifier while storing the telematics unit identifier in memory for later usage; (f) registering the telematics unit with the cellular communications network using a process that includes sending the mobile device identifier to the cellular communications network for use by the network as an identifier for the telematics unit; (g) placing a data call from the telematics unit to a call center; (h) sending the mobile device identifier to the call center over the cellular communications network for use by the call center in contacting the telematics unit; (i) detecting that the Bluetooth connection has terminated; (j) retrieving the telematics unit identifier from the memory; (k) restoring the retrieved telematics unit identifier in the telematics unit in place of the mobile device identifier; and (l) re-registering the telematics unit with the cellular communications network using the retrieved telematics unit identifier so that the telematics unit identifier is used by the network in connecting subsequent calls to the telematics unit.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The system and methods described below are directed to different embodiments of an approach that enables telephone communication to and from a vehicle telematics unit using a personal mobile device identifier. Using the system described herein, a vehicle operator can switch over from use of their mobile phone, for example, to the vehicle telematics unit while they are in the vehicle, while preserving the ability of a call center to provide services to the vehicle and its operator via the telematics unit.

Communications System—

Figure 1:
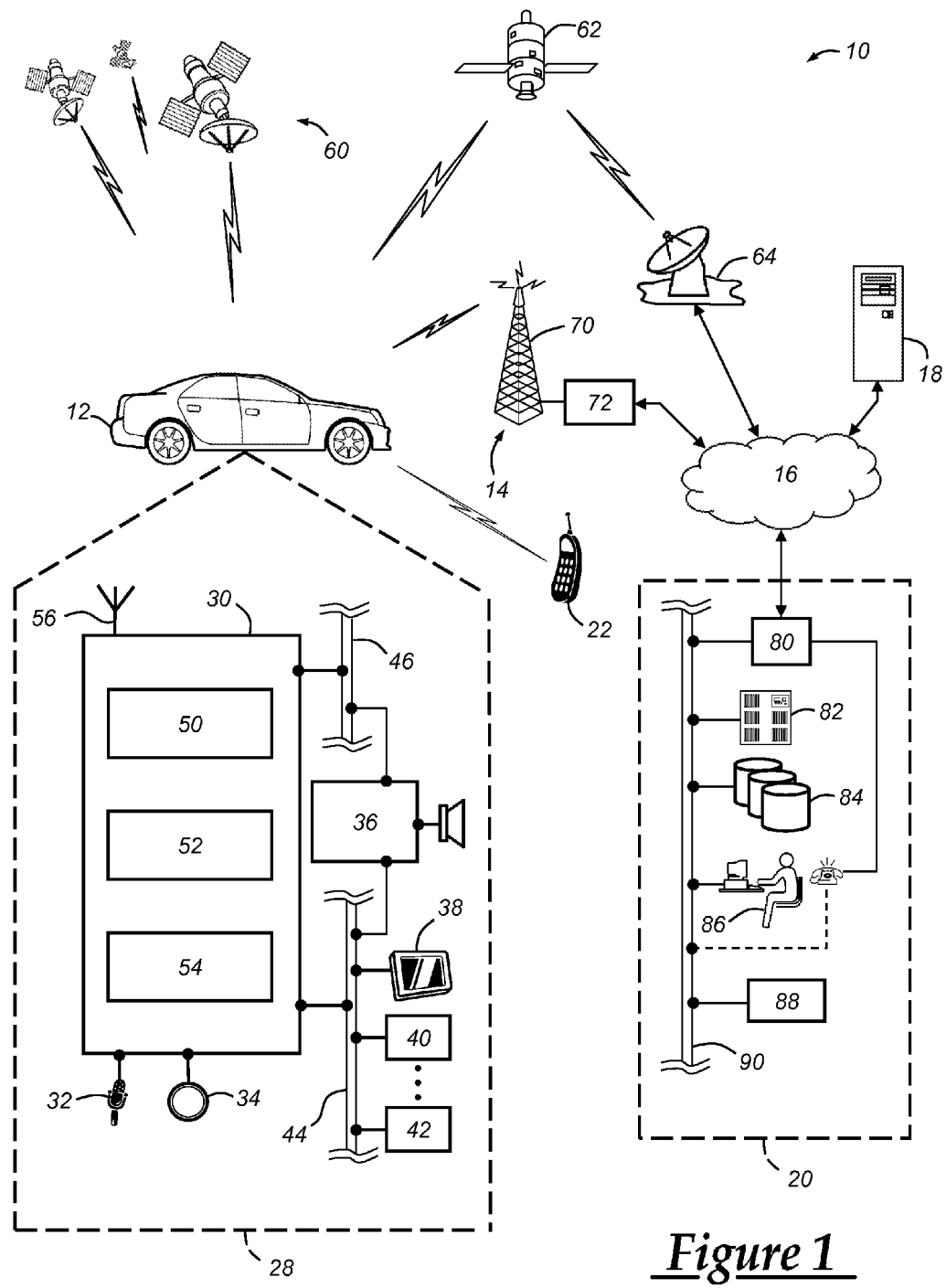
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Apart from computer 18, other types of remotely located processing devices can be used. For example, a mobile device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In the illustrated embodiment, mobile device 22 is a mobile phone also known as a cell or cellular phone that connects to a cellular network such as system 14. In another embodiment, mobile device 22 can be a personal digital assistant (PDA) that may or may not provide telephony services. Mobile device 22 can employ one of a variety of wireless technology including Bluetooth (e.g. hands-free headset, games, watches, sports sensors, medical devices, etc.), etc. Various other types of suitable processing devices will be apparent to those skilled in the art.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
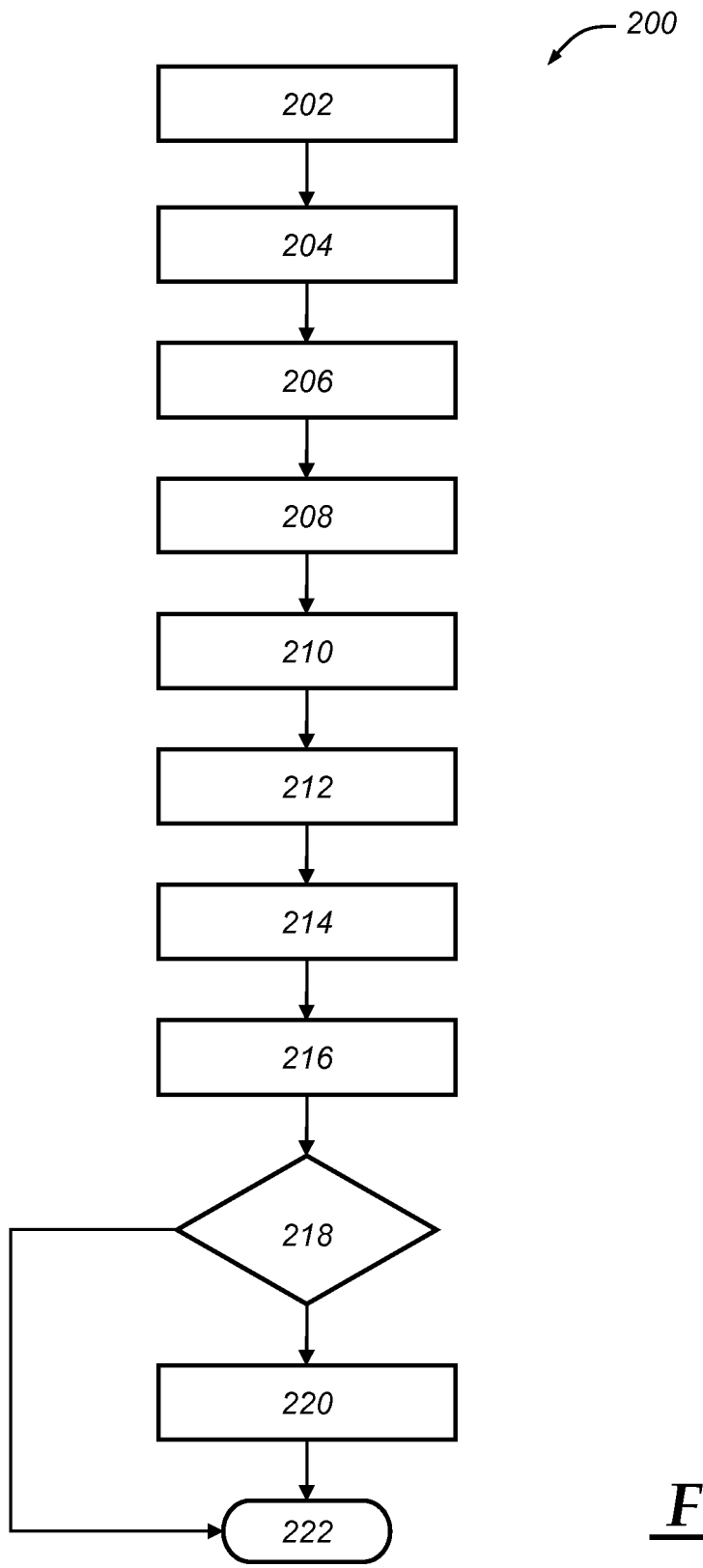
FIG. 2 is a flowchart of an exemplary method of communication between a vehicle telematics unit and a call center using a personal mobile device identifier and the communications system of FIG. 1.

Turning now to FIG. 2, there is shown a method 200 of providing communication between a vehicle telematics unit and a call center using a personal mobile device identifier. In general, the method allows the vehicle telematics unit 30 to take on the identity of the mobile device 22 so that calls to the mobile device can instead be handled by the telematics unit and interfaced to the user using the hands-free speaker and microphone 32 described above; yet the telematics unit remains accessible by the call center in the event the call center has reason to phone the telematics unit. This arrangement also permits use of the typically stronger cellular antenna capability of the vehicle telematics unit 30 as compared to that of a typical mobile device 22. Initially, the telematics unit 30 is registered on the wireless communication system 14 using a telematics unit identifier that is assigned to that telematics unit. This telematics unit identifier is a permanent identifier in the sense that it is intended to remain uniquely assigned to the telematics unit 30 over its useful life, even though it might be replaced eventually with another permanent identifier. Any suitable telematics unit identifier can be used that enables the telematics unit to be registered on the network and then contacted via the network; for example, an international mobile subscriber identity (IMSI) that provides the telematics unit with its own unique international number. Using the IMSI, the telematics unit with its unique serial number can be registered on a GSM cellular network using known GSM registration processes.

The method 200 starts at step 202 and begins by detecting one or more mobile devices at the vehicle upon ignition startup or other operation of the vehicle. The operation of the vehicle can be defined as an action or series of actions preferably taken by an operator indicative of his or her operation of the vehicle. Such actions can include turning vehicle ignition on, opening one or more doors, closing one or more doors, shifting between gears, driving certain miles, and/or others. Skilled artisan will recognize other actions that can signal a vehicle operation, and that one or more of these can be used to initiate the mobile device discovery process at the desired point in time, such as immediately at ignition on or sometime later. In other embodiments, the vehicle monitors for nearby mobile devices regardless of vehicle ignition state or vehicle operation. Any suitable means of mobile device detection can be used. For example, using Bluetooth technology, there is a device discovery process by which the mobile device 22 provides telematics unit 30 with identifying information. In one exemplary embodiment, telematics unit 30 sends an inquiry signal and receives a response from mobile device 22. Telematics unit 30 may monitor the presence of such devices according to any of several options including continuously monitoring, predetermined time interval monitoring, up to certain number of mobile devices found, and/or other options.

Next, at step 204, if more than one mobile device is detected, method 200 selects the mobile device with the highest priority. The presence of multiple mobile devices might occur because, for example, there are other occupants with mobile devices in the vehicle, or are other people nearby with mobile devices. Determining priority between multiple detected mobile devices can be done in any of a number of ways. For example, telematics unit 30 can ignore any detected devices that have not previously been setup, synchronized, or otherwise connected to the telematics unit. Where multiple devices are detected that have been synchronized or otherwise previously used with the telematics unit, priority between them may be pre-established or may be specified in response to prompting by the telematics unit. Specifying the priority can be done by having the vehicle operator or telematics service subscriber identify a priority between multiple mobile devices that have been or will be connected to the vehicle, or can be done by having just one mobile device identified as the primary one and always giving it priority over others that are detected. In one embodiment, vehicle 12 operator can submit a priority list of mobile devices to a telematics service provider during service subscription, vehicle purchase or lease, at will communication with the service provider (e.g., phone call, email, service website entry, etc.), etc. Then, the list can be saved at call center 20 database 84 and/or can be downloaded to the telematics unit. In another embodiment, the priority is identified at the vehicle, for example, during an initial wireless connection or synchronization between the mobile device and telematics unit 30. In one such embodiment, telematics unit 30 informs the vehicle operator that one or more mobile devices have been found and requests which mobile device should be used. The telematics unit request can be communicated via audio system 36, display 38, and/or other VSM 42. The operator may express the mobile device 22 to be used via microphone 32, display 38, and/or other VSM 42. In yet another embodiment, vehicle 12 operator may enter a mobile device 22 selection after entering vehicle 12, for example, via vehicle electronics 28.

At step 206, method 200 links mobile device 22 to telematics unit 30. In one embodiment, an application software running in telematics unit 30 pairs telematics unit 30 to mobile device 22 via a Bluetooth connection (e.g., class 1-3). Some of the Bluetooth versions that can be used include version 1.1, 1.2, 2.0+EDR, 2.1+EDR, 3.0+HS, etc. operating at 2.402-2.480 GHz frequency. Bluetooth technology is well known by skilled artisans and thus, a description of the technology is omitted here. Other linking methods can be used including WIFI IEEE 802.11, and/or any other networking or communication methods.

At step 208 a mobile device identifier is obtained from mobile device 22. Continuing with the embodiment of step 206, a mobile device identifier can be obtained via a Bluetooth connection. A variety of identifiers can be obtained including Bluetooth identification number (e.g., Bluetooth 48 bit address), phone number, international mobile equipment identity (IMEI), subscriber identity module (SIM) identifier (e.g., international mobile subscriber identity (IMSI), integrated circuit card id (ICC-ID), Authentication Key (Ki), local area identity (LAI) operator-specific emergency number), etc. Other SIM identifiers include carrier specific data such as short message service center (SMSC) number, service provider name (SPN), service dialing numbers (SDN), advice-of-charge parameter, value added service (VAS) applications, etc.

Next, at step 210, the mobile device identifier is assigned to the telematics unit 30, and this can be done in the telematics unit by replacing its permanent telematics unit identifier with the mobile device identifier received from the mobile device 22. Continuing with the embodiment described in previous steps, in this case telematics unit 30 instead of using its own identifier, it assumes mobile device 22 identifier as a temporary identifier that is used by the telematics unit while the mobile device 22 is present at the vehicle. Several techniques can be employed to achieve this task. In one embodiment, Bluetooth SIM access profile (SAP) or remote SIM access profile (rSAP) technique is employed to use the mobile device identifier instead of telematics unit original identifier. In another embodiment, SAP or rSAP technique is employed to provide telematics unit with an identifier if the telematics unit 30 does not have an original identifier.

At step 212, method 200 registers the mobile device identifier as the telematics unit identifier with a wireless communication network used by the telematics unit. This may be done by registering the telematics unit with the wireless communications network using a process that includes sending the mobile device identifier to the wireless communications network for use by the network as an identifier for the telematics unit. For example, in one embodiment using a GSM cellular network, an authentication process may be performed between telematics unit 30 and a wireless communication network using mobile device 22 identifier (e.g., its IMSI) and any needed associated information, such as its authentication key (e.g., $K_i$). The telematics unit 30 can thus be registered using the mobile device identifier as a temporary identifier so that the telematics unit 30 with its unique serial number can be associated with the IMSI of the mobile device 22 rather than its permanent IMSI. As a result, cellular calls placed to the mobile device 22 will instead be connected to the telematics unit 30, thereby allowing the vehicle operator to use the hands-free user interface and other functionality of the telematics unit while in the vehicle, instead of their mobile device. In other embodiments, rather than an IMSI, any suitable mobile device identifier can be used that enables the telematics unit to be registered using the mobile device identifier so that someone dialing the mobile device number will instead be connected to the telematics unit.

Next, at step 214, method 200 places a data call between the vehicle telematics unit and a call center using a wireless communication system such as the one on which it has registered using the mobile device identifier. This call is used to provide the mobile device identifier to the call center so that it can call the vehicle if needed using the now-registered temporary identifier. In one embodiment, telematics unit 30 places a data call to call center 20 via any applicable technique including circuit switched data (CSD) (e.g., circuit switch with an in-band modem, high speed circuit switched data (HSCSD), etc.), general packet radio service (GPRS), enhanced data rates for GSM evolution (EDGE or EGPRS) and universal mobile telecommunications system (UMTS), short message service (SMS), etc. When using an in-band modem over a voice channel, the data call may be initially connected as a voice call which is then switched to a data mode. The data call can be initiated by in a variety of ways. In one embodiment, the data call is initiated by telematics unit 30 each time that step 210 is carried out. In another embodiment, vehicle 12 operator initiates the data via microphone 32, pushbutton 34, and/or any other VSM 42. However, in another preferred embodiment, vehicle telematics 30 initiates a call to call center 20 only when a new mobile device 22 is linked to telematics unit 30. In this embodiment, it should be appreciated that the communication cost between telematics unit 30 and call center 20 will be kept to a minimum. The call can be made by telematics unit 30 more than once if there is a need to. In one embodiment, if telematics unit 30 is unable to reach call center 20, does not receive an acknowledgment from call center 20 during the call, or the communication is lost during the call then the call is repeated. Skilled artisans should appreciate that other embodiments are also possible. For example, other than a packetized or in-band data modem data call, the data session can involve any suitable means of providing the mobile device identifier to the call center, whether using DTMF over a voice connection, one way SMS messaging, etc.

At step 216, method 200 sends the mobile device identifier to the call center over the cellular communication system. Continuing with the previous step, mobile device 22 identifier is sent via the data call established in step 214. In one embodiment, the telematics unit 30 unique identifier, nature of call (e.g., mobile device identifier is provided), and mobile device 22 identifier (e.g., IMSI) are provided to call center 20. Of course, additional information can be provided as well such as vehicle VIN number, and/or other relevant data.

At step 218, method 200 determines whether the temporary identifier being used by telematics unit 30 is new or has already been previously provided to the call center 20. In one embodiment, call center 20 searches the record(s) in its database 84 that is associated with the telematics unit assigned to vehicle 12 based either on a unique identifier (e.g., serial number) for the telematics unit or for the vehicle 12 (e.g., by VIN). That record may include the permanent telematics unit identifier that is normally used by the call center to contact the vehicle, and may or may not include one or more temporary identifiers that have previously been provided. If the identifier is already stored, then method 200 reaches its end at step 222, although other steps can be carried out such as marking the already stored temporary identifier as now being active. However, if the identifier is not stored then method 200 moves to step 220 where it stores the identifier in call center 20 (e.g., in database 84). Once stored, the call center now has both the permanent and temporary identifiers such that it can use one or the other to contact the vehicle. For example, where the call center subsequently has reason to contact the vehicle (e.g., theft tracking, emergency situation, returning dropped call from the vehicle), it may initially attempt to place a call using the permanent identifier and, if not successful, may then retry using the temporary identifier(s). In this way, the vehicle operator can utilize the benefits of having its mobile device calls answered by the telematics unit, while still enabling the call center to contact the vehicle if needed.

Accordingly, following the notification to the call center 20 of the now-registered mobile device identifier for the telematics unit 30, the call center can provide one or more telematics services that involve calling the telematics unit by utilizing the temporary mobile device identifier to contact the vehicle. This includes any of the telematics services identified above or any other service that can be delivered in whole or in part by wireless communication with the vehicle 12. This can also include placing a call back to the vehicle in the event that a call for services from the vehicle was dropped.

Once the mobile device 22 is no longer present at the vehicle, for example, due to the vehicle operator parking and leaving the vehicle with the mobile device, the telematics unit may de-register the mobile device identifier from the wireless network so that calls placed to the mobile device identifier are no longer routed to the telematics unit. Detection of the mobile device no longer being present at the vehicle can be done, for example, by detecting a loss of pairing or other communication between the mobile device 22 and telematics unit 30 via the Bluetooth or other short range wireless communication. The telematics unit 30, mobile device 22, or both can then be configured to re-register with the network—the telematics unit using its permanent identifier and the mobile device with its identifier. De-registering of the mobile device identifier by the telematics unit can be done using any suitable registration/de-registration process used by the wireless communication system and, in some embodiments, can be done implicitly either by it re-registering with the network using its permanent telematics device identifier or by the mobile device registering with the network using the mobile device identifier, either one of which, or both, may have the effect of de-registering the mobile device identifier.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communication between a vehicle telematics unit and a call center using a personal mobile device identifier, comprising the steps of:
    (a) providing a vehicle telematics unit having an embedded cellular phone that includes a subscriber identity module (SIM) used for communications between the telematics unit and a call center;
    (b) registering the cellular phone with a cellular communications network using a telematics unit identifier stored in the SIM;
    (c) linking to a personal mobile device present at the vehicle via a Bluetooth connection;
    (d) receiving at the telematics unit via the Bluetooth connection, a mobile device identifier stored on a SIM in the mobile device;
    (e) temporarily replacing the telematics unit identifier in the telematics unit with the mobile device identifier while storing the telematics unit identifier in memory for later usage;
    (f) registering the telematics unit with the cellular communications network using a process that includes sending the mobile device identifier to the cellular communications network for use by the network as an identifier for the telematics unit;
    (g) placing a data call from the telematics unit to a call center;
    (h) sending the mobile device identifier to the call center over the cellular communications network for use by the call center in contacting the telematics unit;
    (i) detecting that the Bluetooth connection has terminated;
    (j) retrieving the telematics unit identifier from the memory;
    (k) restoring the retrieved telematics unit identifier in the telematics unit in place of the mobile device identifier; and
    (l) re-registering the telematics unit with the cellular communications network using the retrieved telematics unit identifier so that the telematics unit identifier is used by the network in connecting subsequent calls to the telematics unit.

2. The method of claim 1, wherein step (c) further comprises determining the presence of at least two personal mobile devices at the vehicle, selecting the mobile device with the highest priority to be used from a priority list, and linking to the selected mobile device via the Bluetooth connection.

3. The method of claim 1, wherein the method further comprises, between steps (h) and (i), the steps of ending the data call and subsequently receiving a telephone call at the telematics unit placed from the call center using the mobile device identifier.

* * * * *